United States Patent [19]

Davis

[11] Patent Number: 5,974,143
[45] Date of Patent: Oct. 26, 1999

[54] VIRUS-RESISTENT MECHANISM FOR TRANSACTION VERIFICATION TO CONFIRMING USER

[75] Inventor: Derek L. Davis, Phoenix, Ariz.

[73] Assignee: Intel Corporation, Santa Clara, Calif.

[21] Appl. No.: 08/939,805

[22] Filed: Sep. 30, 1997

[51] Int. Cl.[6] .................................................. H04L 9/00
[52] U.S. Cl. .............................. 380/10; 380/24; 380/49; 345/505
[58] Field of Search ...................... 380/10, 24; 345/505

[56] References Cited

U.S. PATENT DOCUMENTS

| 4,092,524 | 5/1978 | Moreno | 380/50 |
|---|---|---|---|
| 4,215,421 | 7/1980 | Giraud | 380/49 |
| 4,234,932 | 11/1980 | Gorgens | 380/50 |
| 4,271,482 | 6/1981 | Giraud | 380/4 |
| 4,310,720 | 1/1982 | Check, Jr. | 380/50 |
| 4,467,139 | 8/1984 | Mollier | 380/25 |
| 4,544,833 | 10/1985 | Ugon | 380/25 |
| 4,549,075 | 10/1985 | Saada et al. | 380/37 |
| 4,578,531 | 3/1986 | Everhart et al. | 380/25 |
| 4,588,991 | 5/1986 | Atalla | 380/25 |
| 4,638,120 | 1/1987 | Herve | 455/4.1 |
| 4,656,474 | 4/1987 | Mollier et al. | 380/23 |
| 5,133,079 | 7/1992 | Ballantyne et al. | 178/22.08 |
| 5,231,666 | 7/1993 | Matyas | 340/825.31 |
| 5,355,414 | 10/1994 | Hale et al. | 178/22.08 |
| 5,381,480 | 1/1995 | Butter et al. | 235/380 |
| 5,437,464 | 8/1995 | Terasima et al. | 273/434 |
| 5,473,692 | 12/1995 | Davis | 235/379 |
| 5,481,611 | 1/1996 | Owens et al. | 178/22.08 |
| 5,539,828 | 7/1996 | Davis | 380/50 |
| 5,568,552 | 10/1996 | Davis | 364/900 |
| 5,796,840 | 8/1998 | Davis | 364/900 |
| 5,805,706 | 9/1998 | Davis | 364/900 |
| 5,805,712 | 9/1998 | Davis | 235/419 |
| 5,847,715 | 12/1998 | Fujita et al. | 345/443 |

Primary Examiner—Tod R. Swann
Assistant Examiner—Paul E. Callahan
Attorney, Agent, or Firm—Blakley, Sokoloff, Taylor & Zafman LLP

[57] ABSTRACT

The present invention relates to a system comprising a host processor, a video subsystem and a cryptographic device. The cryptographic device includes dedicated circuitry to cause information associated with a financial transaction to be internally configured for display on a monitor of the video subsystem without being processed by host processor.

33 Claims, 6 Drawing Sheets

VIRUS-RESISTENT MECHANISM FOR TRANSACTION VERIFICATION TO CONFIRMING USER

BACKGROUND OF THE INVENTION

1. Field of the Invention

The present invention relates to the field of cryptography. More particularly, the present invention relates to a non-corruptible mechanism for ensuring that data associated with a transaction is accurately displayed on a display monitor before the data is transmitted over a communication link.

2. Description of Art Related to the Invention

Over the past few years, more businesses and individuals are performing on-line financial transactions over a communication link such as the Internet or any other Wide Area Network ("WAN"). Normally, on-line financial transactions are carefully reviewed for accuracy before transmission, especially when the financial transaction includes confidential financial data such as a payment authorization. Herein, "payment authorization" may include, but is not restricted or limited to a credit card charge request, an Automated Teller Machine (ATM) withdrawal request or any other crediting or debiting request.

It is well known that host software is used to control, among other things, a video subsystem of a personal computer (PC). Before transmitting payment authorization, traditional host software running on a PC causes certain information associated with the financial transaction to be displayed on its monitor. If the user approves the financial transaction, he or she may be required to perform an action that can be interpreted as "user approval". The action may include (i) entering a password, (ii) depressing a button, or (iii) inserting or swiping a token card such as any magnetic-strip card or smart card.

For current PC platforms, each party to an on-line financial transaction is susceptible to fraud by corrupting host software (e.g., illicitly modifying the functionality of the host software). For example, host software may be corrupted by a software virus created to increase or decrease an amount of the payment authorization, unbeknownst to a PC user (e.g., a first party of the financial transaction). As a result, during the financial transaction, the first party may view his or her monitor believing that payment authorization is for a first monetary amount. However, due to virus corruption of the host software, payment authorization is being made for a second monetary amount, which is significantly greater than the first monetary amount. Likewise, the same situation may happen to a second party of the transaction where he or she believes that a desired amount has been credited. Actually, due to host software corruption, a lesser amount has been credited.

Therefore, it would be desirous to implement a simple mechanism used for verifying certain attributes of any transaction, but is resistant to corruption by host software.

SUMMARY OF THE INVENTION

The present invention relates to an electronic system comprising a host processor, a video subsystem and a cryptographic device. In contrast with legacy architecture, the present invention utilizes a cryptographic device to configure information associated with a financial transaction for display without assistance of the host processor.

BRIEF DESCRIPTION OF THE DRAWINGS

The features and advantages of the present invention will become apparent from the following detailed description of the present invention in which.

DESCRIPTION OF THE PREFERRED EMBODIMENT

The present invention relates to a mechanism for accurately displaying information of an intended transaction prior to its transmission over a communication line. Herein, an "electronic system" is electronic hardware having display and processing functionality such as, for example, a portable or desktop computer with a monitor, an Automated Teller Machine (ATM) and the like. "Information" is defined as one or more bits of data, address, and/or control. A "communication line" is defined as one or more information carrying mediums (e.g., electrical wire, fiber optic, or cable) or wireless communications through infrared or radio frequency signals. The term "secure" indicates that it is virtually computationally infeasible for an unauthorized individual to access information in a non-encrypted format or to successfully perpetrate fraud by tampering with such information.

Figure 1:
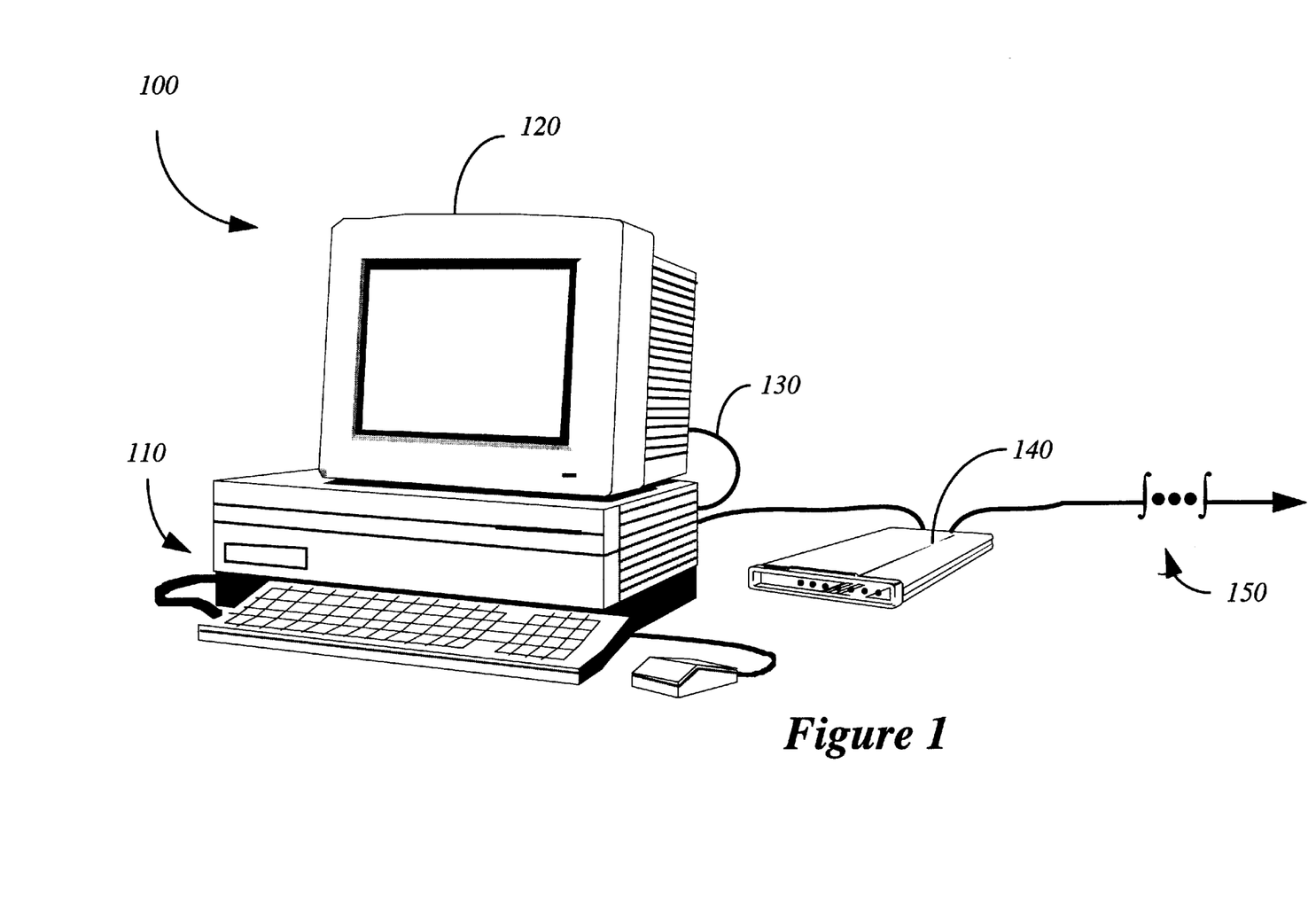
FIG. 1 is a first embodiment of the PC platform including a monitor having a main screen display that supports a high priority window that is required to be displayed during a financial transaction.

Referring to FIG. 1, a perspective view of a first embodiment of an electronic system 100 employing the present invention is shown. The electronic system 100 comprises a computer 110 connected to a monitor 120 through a display communication line 130. Monitor 120 may include a cathode ray tube or any flat panel display such as those used by portable computers (e.g., a laptop, hand-held, etc.). Computer 110 is further loaded with software (e.g., browser software, banking software, or any other communications software) and connected to a transceiver device 140 (e.g., an external modem as shown, networking card, etc.). Transceiver device 140 enables computer 110 to receive and transmit information over a communication line 150, which allows electronic system 100 to establish and maintain communications with other remotely located electronic systems. The communication line 150 may include, but is not limited or restricted to telephone lines partially forming a wide area network ("WAN"), an integrated services digital network ("ISDN") line, a cellular phone channel and the like.

Figure 2:
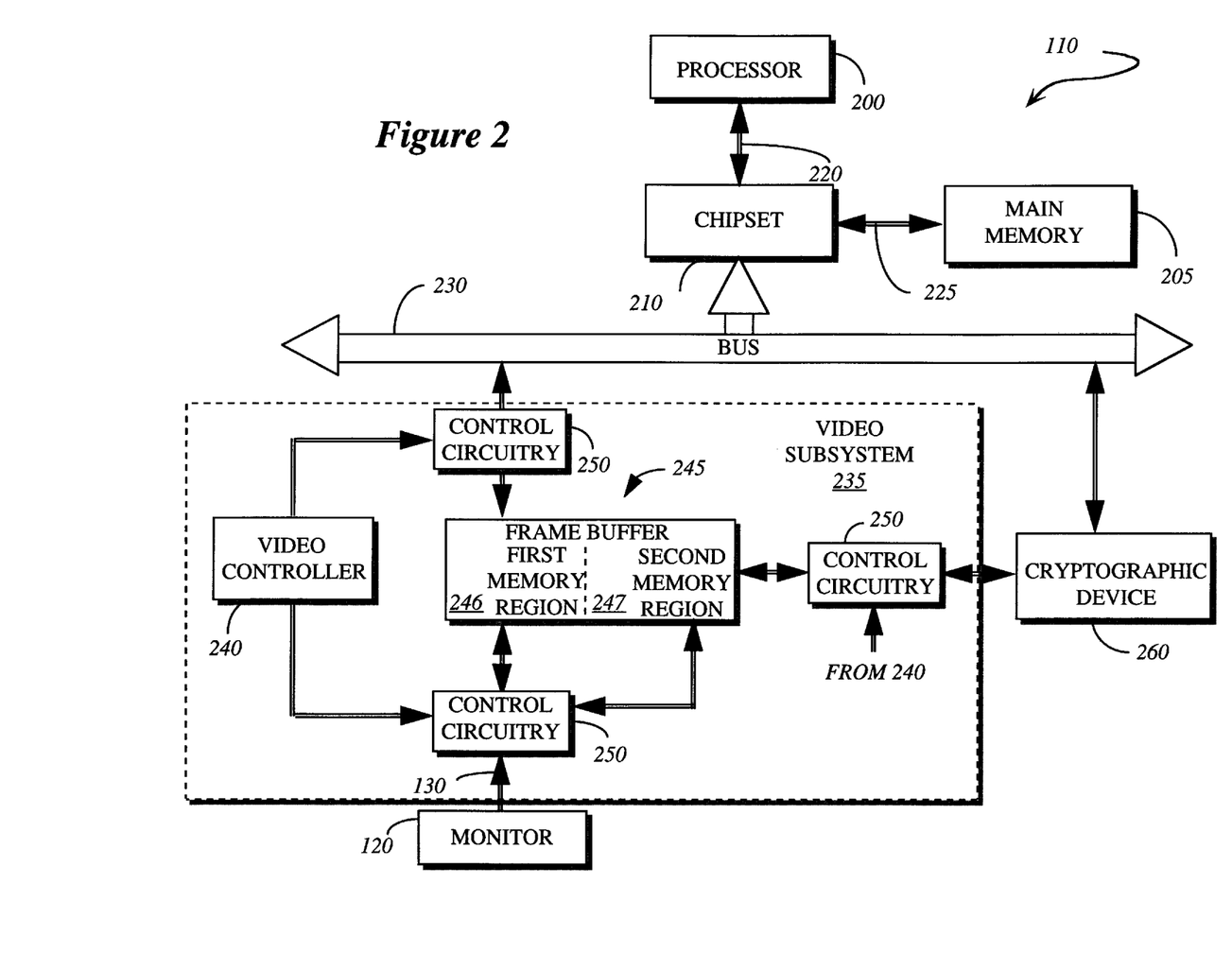
FIG. 2 is a block diagram of an illustrative embodiment of internal circuitry implemented within the PC platform of FIG. 1.

Referring now to FIG. 2, computer 110 of electronic system 100 includes a processor 200 and a main memory 205 connected to a chipset 210 through a host bus 220 and a memory bus 225, respectively. While main memory 205 is responsible for storing information (e.g., software) for financial transactions, processor 200 is capable of executing software to conduct transactions over the communication line. Processor 200 includes one or more microprocessors and main memory 205 includes volatile memory such as dynamic random access memory (DRAM), static random access memory (SRAM) or any other memory type. The chipset 210 operates as an interface between a plurality of buses; namely the host bus 220, the memory bus 225 and bus 230.

As shown, bus 230 enables communications between the processor 200 and a video subsystem 235. The bus 230 may be implemented as an Accelerated Graphics Port (AGP) bus, a Peripheral Component Interconnect (PCI) bus, or possibly a bus featuring another type of bus architecture. It is contemplated that bus 230 is shown as a single bus, but it may include multiple buses connected together through bridge circuitry in which the video subsystem 235 is connected to at least one of the multiple buses. It is further contemplated that bus 230 may support communications between video subsystem 235 and a cryptographic device 260.

The video subsystem 235 includes a video controller 240, a frame buffer 245, and control circuitry 250. The video controller 240 operates in cooperation with control circuitry 250 in order to store information within frame buffer 245. This information typically includes data or control such as graphics commands.

As shown, frame buffer 245 is partitioned into a first memory region 246 and a second memory region 247. The first memory region 246 is accessible to processor 200; however, the second memory region 247 is inaccessible to processor 200. One technique of making second memory region 247 inaccessible to processor 200 is by setting its address port to a starting address exceeding the address range supported by processor 200. Although not shown, another technique is to implement multiple frame buffers, which are logically separate from each other. Thus, one or more of these frame buffers may be configured to be inaccessible by processor 200 simply from the lack of a communication path between processor 200 and that frame buffer(s).

In the event that a partitioned frame buffer is implemented in the video subsystem 235, cryptographic device 260 is solely configured with the ability to access second memory region 247 via a dedicated bus or bus 230. As a result, in response to detecting a financial transaction, cryptographic device 260 processes the information associated with the financial transaction and loads this information for display purposes into the second memory region 247. Such information may include a total price, quantity of goods and the like.

At time of display, video controller 240 signals control circuitry 250 to receive certain information contained within various addresses of the second memory region 247. This information is placed in a display format (e.g., WINDOWS™) which, in turn, is either converted for transmission to monitor 120 in an analog format or transmitted to monitor 120 in a digital format. This operation occurs without assistance of software executed on host processor 200.

In the event that logically separate frame buffers are implemented in video subsystem 235, cryptographic device 260 is solely configured with access to one or more frame buffers (referred to as "secure frame buffer"). As a result, in response to detecting a financial transaction, cryptographic device 260 processes the information and loads that information for display purposes into the secure frame buffer. At the time of display, video controller 240 signals control circuitry 250 to retrieve certain information contained within various addresses of the secure frame buffer, to place the information is a suitable display format, and to transmit the information to monitor 120 possibly in a converted, analog format.

Figure 3:
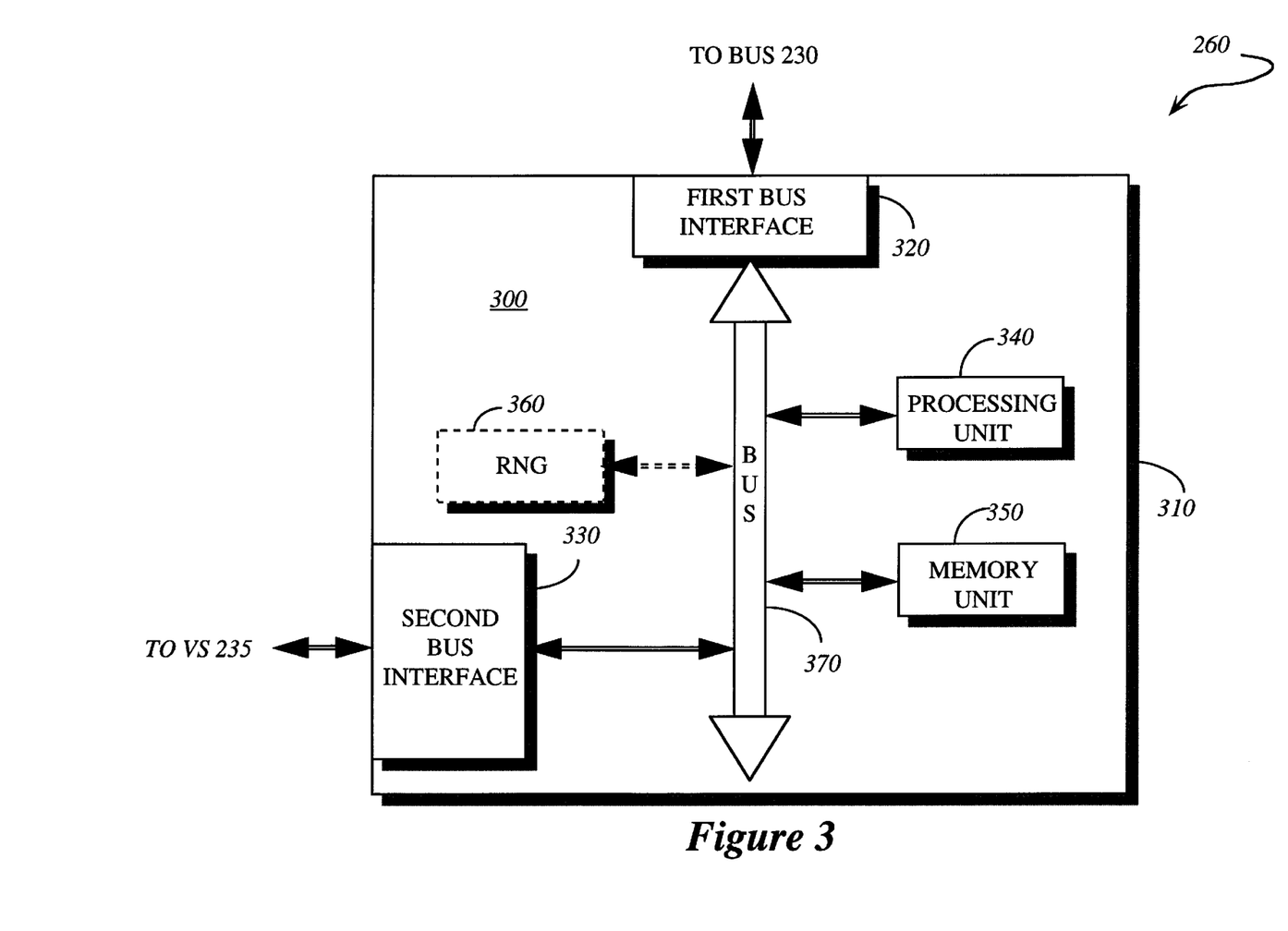
FIG. 3 is a block diagram of internal circuitry of a cryptographic device being a portion of the internal circuitry implemented within the PC platform of FIG. 1.

Referring to FIG. 3, cryptographic device 260 of FIG. 2 comprises one or more integrated circuits 300 enclosed within a package 310 for protection against damage and harmful contaminants. Integrated circuit(s) 300 comprises a first bus interface 320, a second bus interface 330, a processing unit 340, a memory unit 350 and an optional random number generator (RNG) 360 (represented by dashed lines) connected together by an internal bus 370. The first bus interface 320 enables communications through bus 230 of computer 110. The second bus interface 330 allows information especially, dealing with financial transactions, to be processed within a secure environment of package 310 by processing unit 340 executing pre-loaded financial transaction software. The information, produced from execution of the financial transaction software, is loaded into video subsystem 235 of the computer (see FIG. 2) for subsequent display. The display of this information may be in a WINDOWS™ format that would have dominant display priority to avoid such information being hidden under other visible windows.

Processing unit 340 is contained with package 320 to prevent access of a private key associated with the cryptographic device 260 through virus attack. Furthermore, software related to the processing of transactions and managing sensitive data may execute within the protected execution environment provided by processing unit 340. The use of viruses is a common method of disrupting a computer system to obtain its private key.

Memory unit 350 may include a non-volatile memory element which retains at least key information (e.g., public/private key pair) associated with the cryptographic device 260 even when supply power is discontinued. Of course, memory unit 340 may include financial transaction software. The memory unit 340 may further include random access memory (RAM) in order to provide temporary storage for use by processing unit 340.

Although the cryptographic device 260 is implemented as a peripheral device on bus 230 for greater security, it is contemplated that the cryptographic device 260 could be implemented in several alternative embodiments at the PC platform level. One alternative embodiment is to implement cryptographic device 260 as one component of a multi-chip module. This embodiment may be applicable in a chipset architecture formed with first bridge element 210 and having the functionality of cryptographic device 260. Also, the functionality of the cryptographic device 260 may be incorporated within the host processor itself. Yet another embodiment has no connection with PC platforms; rather, it involves the cryptographic device 260 being implemented into (i) any input/output ("I/O") transceiver device (e.g., fax/modem card, external modem, network interface card, etc.) connected to the communication link between a computer 100 and the I/O peripheral device (e.g., transceiver device 140), or (ii) within the communication link 150 itself.

Figure 4:
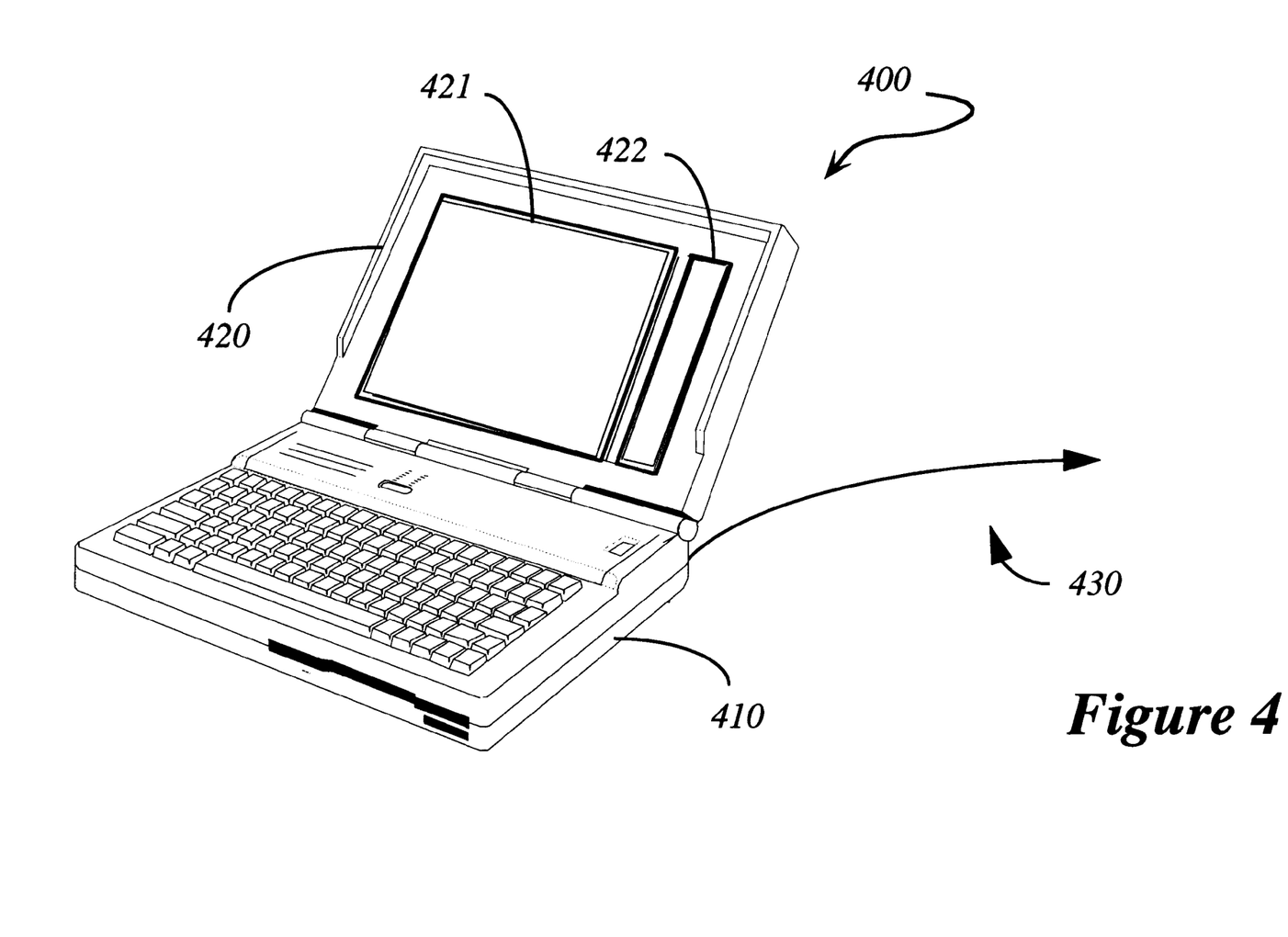
FIG. 4 is a second embodiment of a PC platform including a monitor includes a main screen display and a transaction display.

Referring now to FIG. 4, a perspective view of a second embodiment of an electronic system implemented with the present invention is shown. The electronic system 400 comprises a computer 410 connected to a monitor 420 through a display communication line (not shown). Similar to FIG. 1, computer 410 is further connected to a communication line 430. However, differing from the monitor 120 of FIG. 2, monitor 420 includes a main display screen 421 and a transaction display screen 422. Both the main display screen 421 and the transaction display screen 422 operate independent from one another. These displays 421 and 422 may be designed in accordance with flat panel display technology (e.g., liquid crystal displays, active matrix displays, etc.), cathode ray tube technology and the like.

As shown, the transaction display screen 422 is lesser in physical dimensions than the main display screen 421. The purpose of the transaction display screen 422 is to illustrate information pertaining to the transaction in any of a number of formats, including producing alphanumeric text for display, displaying various symbols, illuminating a symbol outlined in the display. Examples of this information include a destination of the information, an amount of the payment authorization (if any) or any other information relevant to the transaction.

Figure 5:
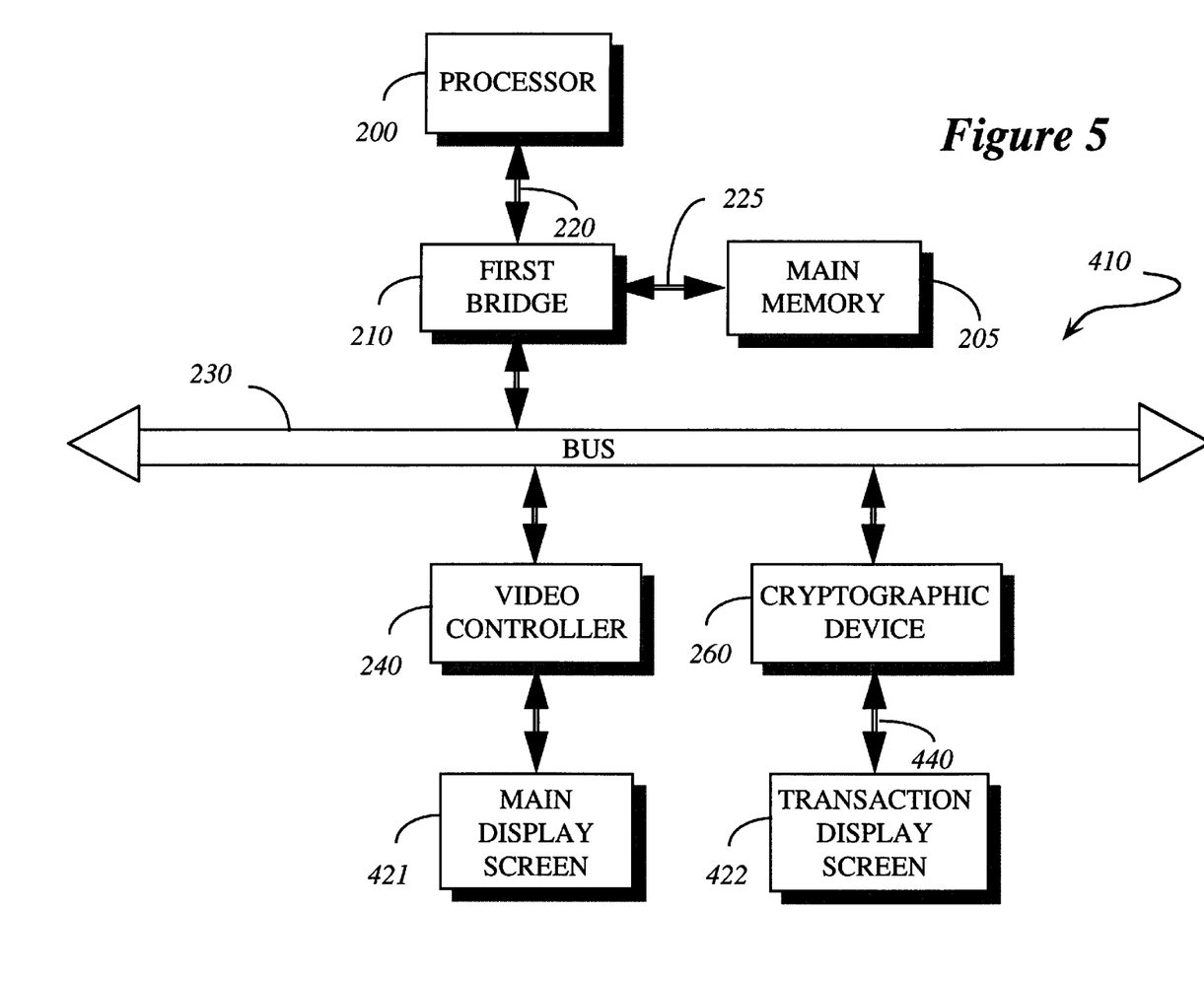
FIG. 5 is a block diagram of an illustrative embodiment of internal circuitry that may be implemented within the PC platform of FIG. 4.

Referring to FIG. 5, computer 410 of the electronic system 400 is identical to computer 110 of FIG. 2, except for the relationship between cryptographic device 260, video controller 240 and display screens 421 and 422 of monitor 420. The video controller 240 is in communication with bus 230 and main display screen 421. The video controller 240 receive information from bus 230 and drives such information, possibly with a different format, to main display screen 421. Thus, processor 200 is able to control data transmissions to main display screen 421. The cryptographic device 260, however, is directly connected to the transaction screen display 422 over a dedicated communication line 440. This allows cryptographic device 260 to exclusively output information for display on the transaction screen display without effect or influence by host processor. As mentioned, functionality of cryptographic device 260 may be implemented within a chipset as shown.

Figure 6:
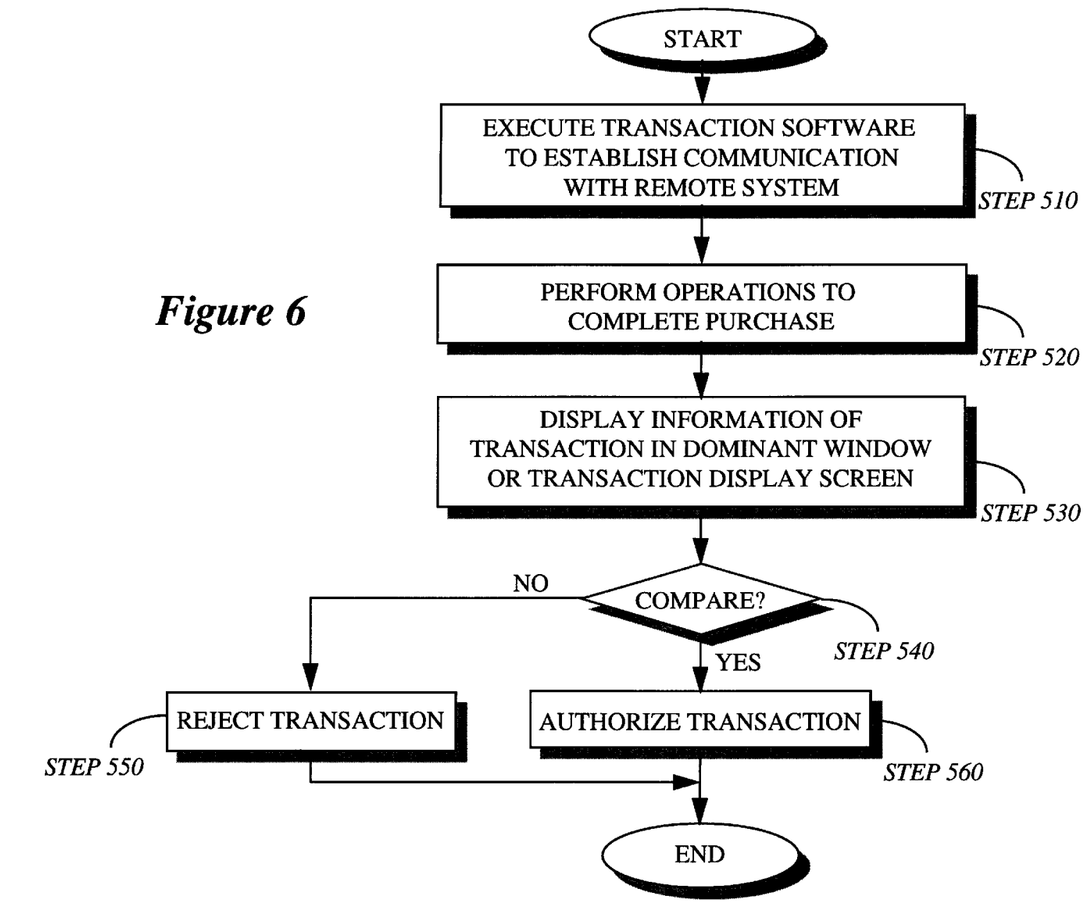
FIG. 6 is an illustrative flowchart of cryptographic operations performed by a cryptographic device of the PC platform of FIG. 4.

Referring now to FIG. 6, the method for ensuring accurate display of information concerning a financial transaction before transmission over a communication link is shown. Initially, transaction software is executed by the electronic system to establish a connection to an electronic system of a party of the financial transaction (block 510). In this case, the communication is established to a server of a retail business selling a particular product over the Internet. Next, in block 520, the user of the electronic system performs operations to represent that the user would like to purchase the particular product and these operations lead to an event where the user needs to provide authentication to complete the purchase (e.g., provide credit card number and expiration date, etc.). At this point, information associated with the financial transaction is displayed through a dominant window or separate display to reflect the true financial transaction being authorized and the normal display (block 530). These values are compared with intended transaction values (block 540), usually in a visual manner. If there exists a discrepancy, the user would be alerted that its host software is corrupted and possibly the transaction is fraudulent. This prompts rejection of authorization by the user (block 550). Of course, software may be coded to generate pop-up window to warn the user without relying solely on visual perception. Otherwise, authorization may be initiated (Step 560).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An electronic system comprising:
a video subsystem including a video controller and a frame buffer partitioned into multiple memory regions, a first region accessible to a host processor and a second region is inaccessible to a cryptographic device; and
the cryptographic device coupled to the video subsystem, the cryptographic device including dedicated circuitry to cause information associated with a financial transaction to be internally configured for display without assistance by the host processor.

2. The electronic system of claim 1, wherein the cryptographic device including
an internal communication line;
a processing unit coupled to the internal communication line;
a random number generator coupled to the processing unit; and
a memory element coupled to the internal communication line.

3. The electronic system of claim 2, wherein the cryptographic device is encased in a multi-chip module having a plurality of integrated circuits, the processing unit and random number generator implemented in logic circuitry forming one of the plurality of integrated circuits.

4. The electronic system of claim 1 further comprising a display monitor coupled to the video subsystem.

5. The electronic system of claim 1 further comprising a main display screen in communication with the video subsystem and a transaction display screen in communication with the cryptographic device.

6. The electronic system of claim 5, wherein the main display screen operates independently from the transaction display screen.

7. The electronic system of claim 1, wherein the information associated with the financial transaction includes a price of goods ordered on-line.

8. The electronic system of claim 1, wherein the at least one of the plurality of frame buffers is accessible exclusively by the cryptographic device.

9. An electronic system comprising:
a host processor;
a cryptographic device; and
a frame buffer coupled to the host processor and the cryptographic device, the frame buffer including a first memory region accessible by the host processor and a second memory region accessible by the cryptographic device and inaccessible by the host processor.

10. The electronic system of claim 9, wherein the second region of the frame buffer is a separate frame buffer inaccessible by the host processor.

11. The electronic system of claim 9, wherein the cryptographic device including dedicated circuitry to cause information associated with a financial transaction to be internally configured for display without assistance of the host processor.

12. The electronic system of claim 9, wherein the dedicated circuitry including
a communication link coupled to an input of the frame buffer inaccessible by the host processor;
a bus interface coupled to the communication link;
a processing unit coupled to the bus interface;
a random number generator coupled to the processing unit; and
a memory element coupled to the bus interface.

13. The electronic system of claim 12, wherein the cryptographic device is encased in a multi-chip module having a plurality of integrated circuits, the processing unit and random number generator implemented in logic circuitry forming one of the plurality of integrated circuits.

14. The electronic system of claim 9, wherein the first memory region and the second memory region are associated with a partitioned frame buffer.

15. The electronic system of claim 14, wherein the second memory region is exclusively accessible by the cryptographic device.

16. An electronic system comprising:
   a buffer;
   a processor having access only to information in a first portion of the buffer; and
   a cryptographic device having access to information in a second portion of the buffer.

17. The electronic system of claim 16, wherein the second portion of the buffer includes a logically separate buffer inaccessible by the processor.

18. The electronic system of claim 17, wherein the logically separate buffer is solely accessible by the cryptographic device.

19. The electronic system of claim 16, wherein the cryptographic device includes dedicated circuitry to cause information associated with a financial transaction to be internally configured for display without assistance of the processor.

20. The electronic system of claim 16 further comprising a monitor to display information associated with a financial transaction that is stored in the second portion of the buffer.

21. The electronic system of claim 20, wherein the information associated with the financial transaction having a higher display priority than information from the first portion of the buffer to avoid the information associated with the financial transaction from being hidden from view.

22. The electronic system of claim 16 further comprising a main display screen in communication with the video subsystem and a transaction display screen in communication with the cryptographic device.

23. The electronic system of claim 16, wherein the main display screen operates independently from the transaction display screen.

24. The electronic system of claim 16, wherein the information associated with the financial transaction includes a monetary payment price.

25. The electronic system of claim 16, wherein the dedicated circuitry includes
   a bus interface;
   a processing unit coupled to the bus interface;
   a random number generator coupled to the processing unit; and
   a memory element coupled to the bus interface.

26. The electronic system of claim 25, wherein the cryptographic device is encased in a multi-chip module having a plurality of integrated circuits, the processing unit and random number generator are implemented in logic circuitry forming one of the plurality of integrated circuits.

27. The electronic system of claim 16, wherein the buffer is partitioned into the first portion being a first memory region of the buffer and the second portion being a second memory region of the buffer that is inaccessible by the processor.

28. The electronic system of claim 27, wherein the information stored in the second portion of the buffer is solely accessible by the cryptographic device.

29. An electronic system comprising:
   a processor;
   a video controller;
   a buffer partitioned into multiple memory regions including a first region accessible to the processor and a second region inaccessible to the processor; and
   a cryptographic device coupled the buffer, the cryptographic device having access to the second region of the buffer for storage of information associated with a financial transaction therein without need of assistance by the processor.

30. The electronic system of claim 29, wherein the second region of the buffer is only accessible by the cryptographic device.

31. The electronic system of claim 28 further comprising a main display screen in communication with the buffer and a transaction display screen in communication with the cryptographic device.

32. The electronic system of claim 31, wherein the main display screen operates independently from the transaction display screen.

33. The electronic system of claim 32, wherein the information associated with the financial transaction includes a payment price for ordered goods.

* * * * *

UNITED STATES PATENT AND TRADEMARK OFFICE
CERTIFICATE OF CORRECTION

PATENT NO : 5,974,143

DATED : October 26, 1999

INVENTOR(S) : Derek L. Davis

It is certified that error appears in the above-identified patent and that said Letters Patent is hereby corrected as shown below:

On the title page, item [54], Title, please delete "RESISTENT" and insert in lieu thereof --RESISTANT--.

Signed and Sealed this

Twenty-first Day of November, 2000

Q. TODD DICKINSON

Attest:

Attesting Officer

Director of Patents and Trademarks